United States Patent [19]

Mohseni

[11] Patent Number: 5,520,401
[45] Date of Patent: May 28, 1996

[54] STEP DRIVE CYCLE

[76] Inventor: Abbas Z. Mohseni, P.O. Box 6112, Laguna Niguel, Calif. 92607

[21] Appl. No.: 300,369

[22] Filed: Sep. 1, 1994

[51] Int. Cl.[6] .................................................. B62M 1/04
[52] U.S. Cl. ........................ 280/221; 280/241; 280/238
[58] Field of Search ................................ 280/221, 253, 280/255, 87.041, 241, 280; 482/53, 57

[56] References Cited

U.S. PATENT DOCUMENTS

| 1,272,761 | 7/1918  | Bailey      | 280/221 |
|-----------|---------|-------------|---------|
| 1,653,889 | 12/1927 | Clark       | 280/221 |
| 4,779,863 | 10/1988 | Yang        | 272/114 |
| 4,828,284 | 5/1989  | Sandgren    | 280/221 |
| 5,110,148 | 5/1992  | Stienbarger | 280/221 |
| 5,192,089 | 3/1993  | Taylor      | 280/221 |
| 5,224,724 | 7/1993  | Greenwood   | 280/221 |
| 5,294,140 | 3/1994  | Rinkewich   | 280/221 |
| 5,308,301 | 5/1994  | Chiarello   | 482/53  |
| 5,344,371 | 9/1994  | Wang        | 482/53  |
| 5,368,321 | 11/1994 | Berman et al. | 280/221 |

FOREIGN PATENT DOCUMENTS

| 0545027 | 10/1922 | France . |
| 678505  | 3/1930  | France . |
| 690785  | 9/1930  | France . |
| 0102054 | 11/1923 | Switzerland . |

Primary Examiner—Margaret A. Focarino
Assistant Examiner—F. Zeender
Attorney, Agent, or Firm—Gene Scott; Patent Law & Venture Group

[57] ABSTRACT

A bicycle having pivotally mounted steps on alternate sides receives a rider straddling the bicycle frame while standing upon the steps. The rider shifts weight from side to side alternately driving each of the steps downward while the other step moves upward. A belt drive is attached to each step and through a pulley arrangement rotates a pair of drive pulleys on a rear axle to engage and alternately disengage the rear axle or the rear wheel for driving in a forward direction upon each down stroke.

5 Claims, 3 Drawing Sheets

STEP DRIVE CYCLE

FIELD OF THE INVENTION

This invention relates generally to manually powered vehicles or cycles and more particularly to a foot powered bicycle having side-by-side pivoted steps for actuating a drive belt.

BACKGROUND OF THE INVENTION

Invention and use in the subject area is known to the public. The following U.S. and foreign patents disclose and teach certain principles in common with the instant invention.

U.S. Pat. No. 5,294,140

SELF-PROPELLED VEHICLE

Isaac Rinkewich

A self-propelled vehicle which includes a frame having a pair of foot treadles mounted in side-by-side relation and movable with respect to the frame. There is an overrunning clutch for each of the foot treadles and a drive member coupled to its respective foot treadle and driven member coupled to the drive wheel. Each of the overrunning clutches has a planetary gear assembly for coupling the drive member to the respective foot treadle to multiply, by a factor of at least two, the displacement of the clutch driven member by its respective foot treadle.

U.S. Pat. No. 5,110,148

THREE-WHEELED SCOOTER WITH RECIPROCATING TREADLE DRIVE

LeRoy Stienbarger, Frank Gray

A three-wheeled scooter which includes a reciprocating treadle drive which a rider may use to propel the scooter in either the forward or rearward direction. The treadle drive includes a pair of treadles having their rear ends mounted to crank portion of a rear crank drive axle and their forward ends supported by rollers from a bar track having a generally flattened portion as well as an inclined portion. Shifting of weight alternately from one treadle to the other as each rotates, drives the scooter forward or rearward.

U.S. Pat. No. 5,224,724

SCOOTER WITH SIMPLE HARMONIC DRIVE

Marvin H. Greenwood

A scooter having a simple harmonic drive with a platform large enough for a rider to stand on. The platform is mounted to the frame near the forward end and spring biased at the rear end. As the platform is urged up by the rider in a shifting forward and backward motion, an up-and-down harmonic driving movement is created.

FRANCE 545.027

APPAREIL DE LOCOMOTION A SIMPLE OU A DOUBLE EFFORT

Jean-Baptiste Herve, Victor Launau

A bicycle with paddle driven chain mechanism. The design includes a seat. Paddles are attached to rear wheel drive and are alternately depressed in a treading motion, over center drive train assembly causing a forward driving motion.

FRANCE 690.785

PERFECTIONNEMENTS AUX TROTINETTES MECANIQUES

SOCIETE FRANCAISE DU JOUET METAL

A pedal-driven scooter with adjustable gears and chain drive.

FRANCE 678.505

JOUET SPORTIF ET HYGIENEQUE

M. Emile-Henri-Camille Ducommun

The invention teaches a pedal driven bicycle with adjustable tension chain drive train.

U.S. Pat. No. 4,828,284

TREADLE CYCLE

John A. Sandgren

A multi-wheeled vehicle operated by a twin treadle-acting drive train. The left and right treadles drive a rear wheel housing supported stub shaft that has a pair of end-mounted, over-running sprocketed clutches, a drive sprocket and a non-reversing clutch. A derailleur-controlled drive chain transfers power from the drive sprocket to the rear wheel. A pair of tie rod coupled front wheels support an upright steering assembly and steering bar-mounted gear shift and hand brake assembly.

U.S. Pat. No. 4,779,863

RUNNING EXERCISE BICYCLE

Kuey M. Yang

A running exercise bicycle driven by using a treading action on platform style pedals. The treading action works a double-cranked axle to drive two rotary wheels into forward motion. The treading action incorporates a balancing function which can zigzag or move forward in a straight motion.

U.S. Pat. No. 5,192,089

PEDAL-OPERATED SCOOTER

Walter R. Taylor

A pedal-operated scooter with a drive mechanism that includes sprocket chains that engage and disengage for forward and backward motion. The frame is characterized by a low scooter frame which has front and rear wheels and handle bars connected to the front wheel for steering. The single pedal is pivotally mounted on the scooter frame, with front and rear cables extending around corresponding cable pulleys and attached to corresponding sprocket chains. Spaced chain pulleys are engaged by a spring which connects one end of the sprocket chains allowing for free rotation of the corresponding sprocket The instant invention differs significantly from the above described references in that the present invention employs a belt driven mechanism in a unique force amplification configuration, employs an energy absorbing piston pressure system for damping step action and employs a unique clutch with advantages which will be described in the detailed description.

SUMMARY OF THE INVENTION

The present invention may be employed in a bicycle, tricycle or quadricycle configuration. The preferred embodiment is a bicycle. It has no seat in that the driver or operator stands astride the device with his feet on a pair of side-by-side steps. The steps move in up and down pivotal motion driving a single drive belt for actuating a pair of drive pulleys on the rear axle. A pneumatic or modified hydraulic piston system is equipped with adjustable resistance for shock absorbing motion limitation.

The primary objective of this invention is to offer the benefits of a stair step type exercise device as might be found in an exercise gym for jogging exercise with a vehicle providing the added benefit of outdoor involvement and invigoration. Other objectives of the invention include, a simple drive system, use of only a single drive belt, a dampened step system and drive force applied with each down cycle of each step. Simplicity of design in the belt drive results in low cost of parts and low maintenance.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
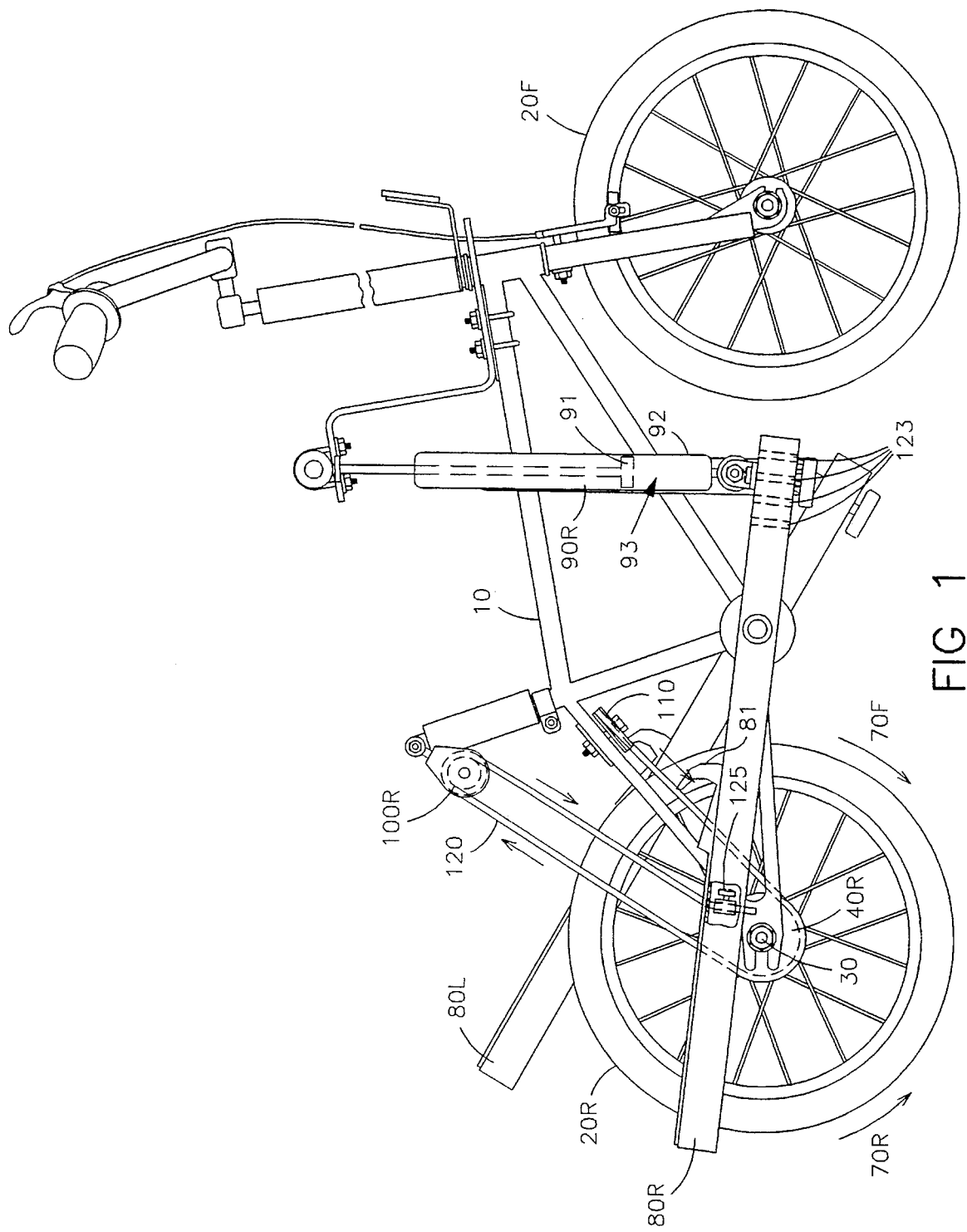
FIG. 1 is a side view of the present invention showing the manner of attachment of the various parts and elements and the overall configuration.

As shown in FIG. 1 the preferred embodiment is a bicycle having a frame 10 mounted upon two rotating wheels 20F, 20R for supporting it in rolling motion on a typical surface such as a street or road. The rear wheel 20F is mounted on a rear axle 30 which also supports a left and a right drive pulley 40L, 40R, mounted coaxially on opposing sides of the rear wheel 20R. Each of the drive pulleys 40L, 40R engages a hub 50 of the rear wheel 20R through a clutch arrangement 60 that provides a drive force to the hub 50 when rotating in a first rotational direction 70F i.e., when the bicycle is rolling in a forward direction, and provides for the drive pulleys 40L, 40R to disengage the hub when rotating in a second rotational direction 70R, the alternate wheel rotational direction. A left and a right elongated step 80L, 80R is pivotally mounted to the frame 10 on respective sides for supporting an operator in a standing position straddling the frame 10. A left and a right energy absorbing means 90L, 90R, preferably a pneumatic or hydraulic cylinder, is pivotally mounted between each one of the steps 80L, 80R and the frame 10. A left and a right belt positioning pulley 100L, 100R is rotatably mounted to the frame 10 above each step 80L, 80R respectively, and a transfer pulley 110 is rotatably mounted to the frame 10 adjacent to the rear wheel 20R. A flexible drive belt 120 is fixed at one end 120L, to the left step 80L, and engages by being wrapped at least partially around, the left belt positioning pulley 100L, the left drive pulley 40L, the transfer pulley 110, the right drive pulley 40R, the right belt positioning pulley 100R, in that order, and terminates at its other end 120R at the right step 80R, the belt positioning pulleys 100L and 100R being positioned to effectively route the drive belt 120 between the steps 80L and 80R and the drive pulleys 40L and 40R respectively, the transfer pulley 110 being positioned to effectively route the drive belt 120 between the drive pulleys 40L and 40R. The belt 120 is attached at its ends 120L, 120R by a simple screw clamp 125 to each of the steps 80L, 80R so that it is easily installed, tightened, and changed.

As seen in FIGS. 3A–3D, the clutch means of the new invention includes a pair of externally threaded portions 130 on the rear axle 30 positioned adjacent, and to each side of a hub 50 of the rear wheel 20R respectively. An internally threaded hole 135 within each of the drive pulleys 40R and 40L engages one of the external threaded portions 130 on the axle 30 respectively for moving the drive pulleys 40R and 40L laterally on the axle 30, toward and alternately away from the hub 50 corresponding to rotation of the drive pulleys 40R and 40L in the first 70F, and alternately the second rotational directions 70R respectively. A set of clutch splines 150 is positioned on a face of each of the drive pulleys 40R and 40L, and on opposing faces of the hub 50. The splines 150 engage the drive pulleys 40L and 40R with the hub 50 when the splines 150 of either drive pulley 40L and 40R and those of the hub 50 are brought into mutual contact, so that with either drive pulley rotating in the first rotational direction 70F drive force is transferred to the hub 50, and with either drive pulley 40L and 40L rotating in the second rotational direction 70R, disengagement of drive pulley 40L and 40R and hub 50 occurs.

Figure 2:
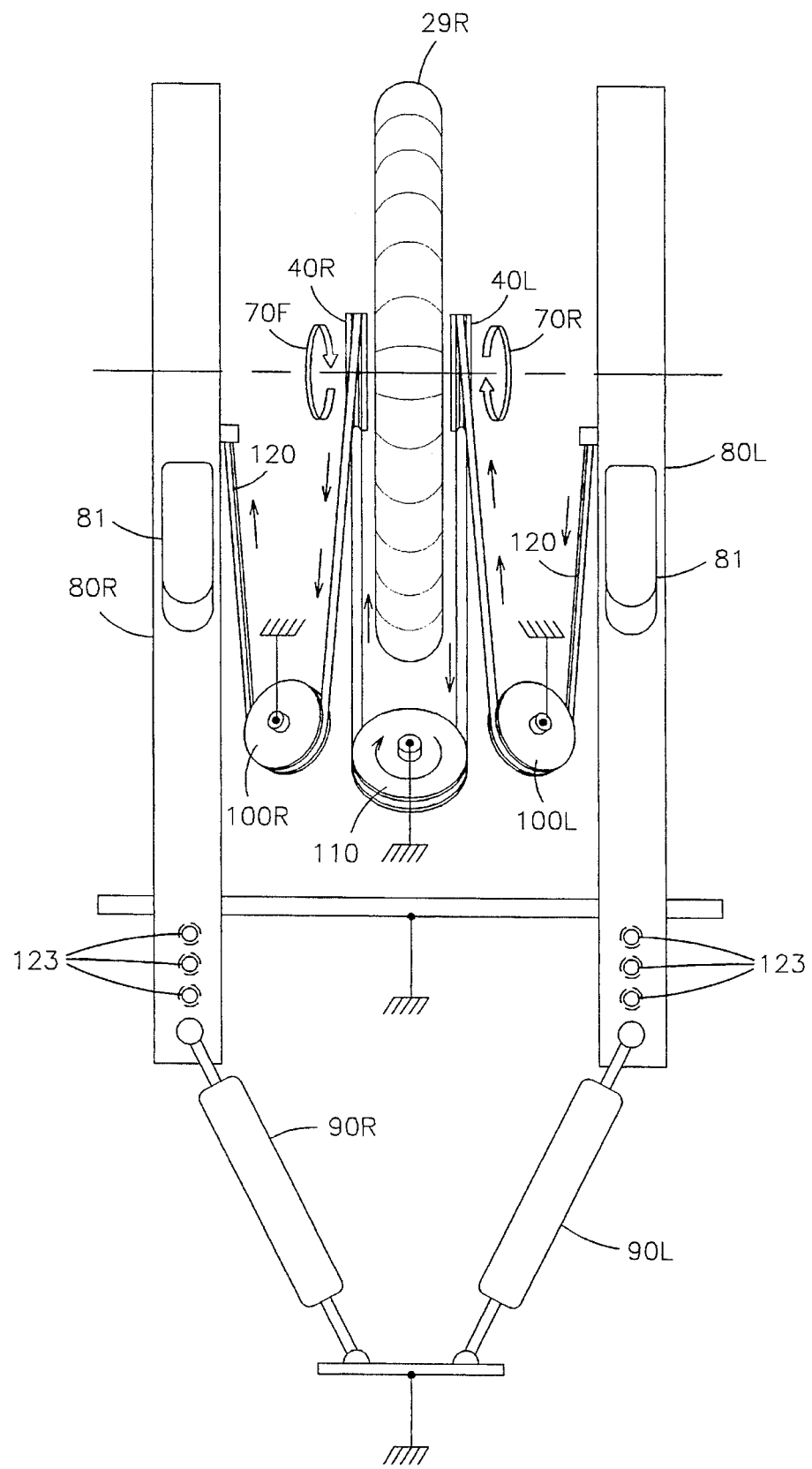
FIG. 2 is a schematic representation of the invention taken from a top plan view perspective and particularly showing the manner of, and interrelationship between the important elements of the invention.
Figure 3C:
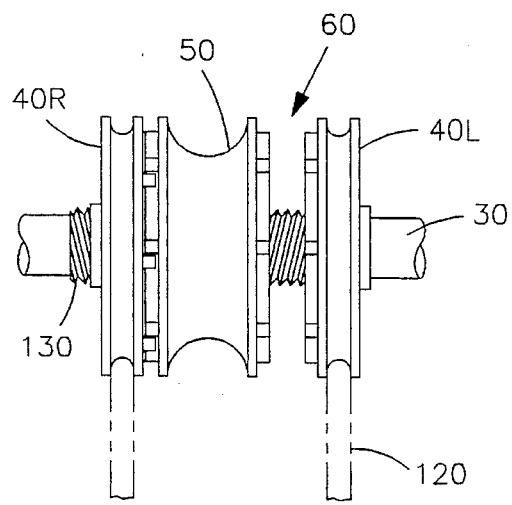
FIG. 3C and 3D are plan views of the rear axle of the invention showing the hub of the rear wheel and the drive pulleys in left and right clutch engagement respectively.
Figure 3D:
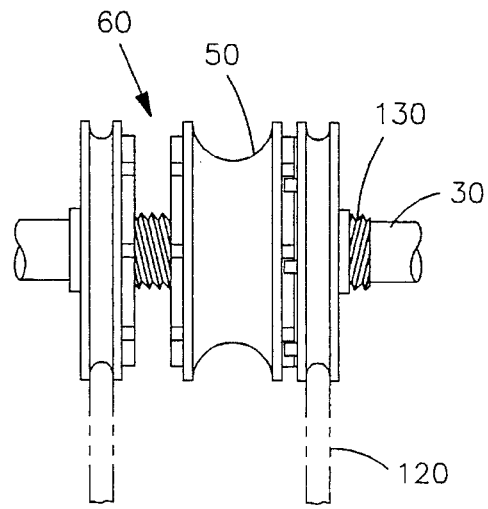
Figure 3B:
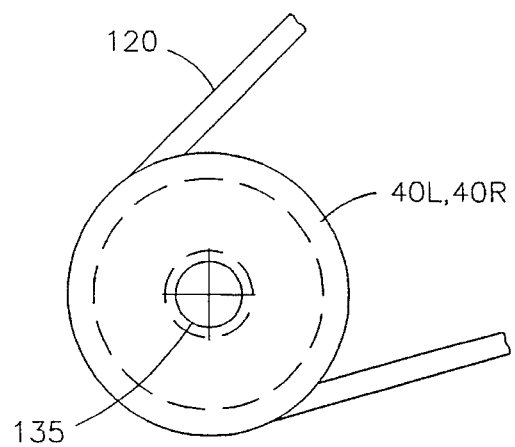
FIG. 3B is a side view of the drive pulley of the invention showing the belt engagement thereon.
Figure 3A:
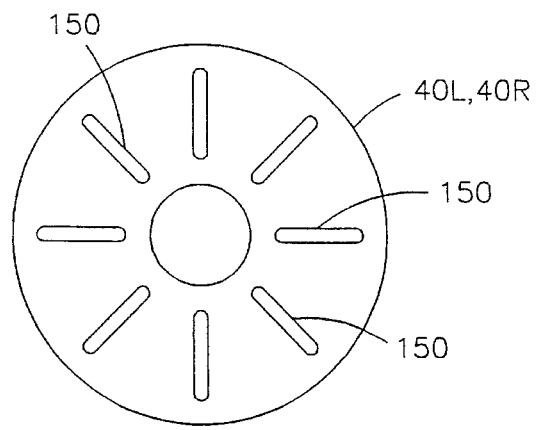
FIG. 3A is a side view of the drive pulley of the invention showing the clutch splines of the invention.

In FIG. 2, when operating the invention, an operator places each foot on each respective step 80L and 80R in the foot engagement means 81 located near the center of each step 80L and 80R used for holding the rider's feet on the steps at a desired position. The operator then transfers his or her body weight between the steps 80L, 80R, in alternate cyclic motion driving each step downwardly in turn while the other step moves upwardly against resistance of the energy absorbing means 90R or 90L. The drive belt 120 moves cyclically in alternate opposite directions reversing its direction in each cycle. Each time the belt 120 moves, it drives one of the drive pulleys 40R or 40L. The drive pulleys 40L, 40R are threaded onto the externally thread portions 130 on the rear axle 30 so that, in turn, and together, the drive pulleys 40R, 40L are rotated and translate laterally on the rear axle 30, each in turn, toward and then away from the hub 50 on the rear wheel 20R. Each of the steps is alternately moved, by body weight, in the downward direction with the corresponding drive pulley being driven in the first rotational direction 70F for applying rotational driving force to the rear wheel 20R through the hub 50 for propelling the vehicle, while the other of the drive pulleys is rotated in the second rotational direction 70R disengagement of the previous drive pulley 40L (40R) occurs, lending to engagement of the alternate drive pulley 40R (40L) with the hub 50.

While this is the prefered method to clutch the drive pulleys 40L and 40R, it is also possible to utilize a mechanism similar to that introduced by Kuey Yang in U.S. Pat. No. 4,779,863, FIG. 4, to perform the same function. Yang suggests the use of a rachet wheel provided inside of a gear (17b). The rachet wheel (18) is rotated by a rachet pawl in a counterclockwise direction along a rachet shaft (19), thus utilizing the drive pulleys 40L and 40R. However, when the gear (17b) is rotated clockwise, said gear can only rotate idly, rendering the drive pulleys 40L and 40R ineffective in the reverse direction. Used with the present invention, the arrangement of Yang would require that each rachet wheel arrangement as well as the drive wheel be fixed to the axle.

The left and right step motion limiting means 90L, and 90R each provide a piston 91 actuated within a cylinder 92 including a viscous fluid 93 for resisting the movement of the piston 91. These step motion limiting means 90L and 90R are arranged in such positions so that the resistance to each step motion may be altered by changing the position at which the motion limiting means 90L and 90R are attached to steps 80L and 80R. This is accomplished by securing the motion limiting means 90L and 90R into one of the adjustment holes 123 at the end of each step 80L and 80R.

A variety of different mechanisms may be utilized to make this adjustable attachment possible. Preferably, the base of motion limiting means 90L and 90R is attached to an L-clamp 123B in which a threaded screw 123A would be placed in any one of four tapped adjustment holes 123. Another possibility is to make the adjustment holes 123 clearance holes in which a screw 123A passes completely through the adjustment holes 123 and is secured on the underside of the step 80L and 80R. Other reasonable methods of the securing motion limiting means 90L and 90R to step 80L and 80R while still maintaining the feature of variable resistance of the step motion may also be employed.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A step operated vehicle comprising a frame mounted upon at least two rotating wheels for supporting the frame in rolling motion on a surface, an axle rotationally supporting a left and a right drive pulley mounted coaxially thereon and engaged for driving the vehicle through a clutch means for transferring drive forces to at least one of the rotating wheels;

a left and a right elongated step pivotally mounted to the frame on respective sides thereof for receiving an operator in a standing position thereon straddling the frame;

a left and a right step motion range limiting means for establishing a desired range of motion of the steps and for resisting motion of the steps; each one pivotally mounted between each one of the steps and the frame;

a left and a right belt positioning pulley, one rotatably mounted to the frame in a position above the left and right steps respectively;

a transfer pulley rotatably mounted to the frame adjacent to one of the two rotating wheels;

a flexible drive belt fixed at one end to the left step, and therefrom engaging the left belt positioning pulley, the left drive pulley, the transfer pulley, the right drive pulley, the right belt positioning pulley and terminating at the other end fixedly at the right step, the belt positioning pulleys being positioned to effectively route the drive belt between the steps and the drive pulleys respectively, the transfer pulley being positioned to effectively route the drive belt between the drive pulleys;

the operator transferring body weight between steps in alternate cyclic motion driving each one of the steps downwardly in turn while the other of the steps moves upwardly, the drive belt moving cyclically in alternate directions for rotating the drive pulleys simultaneously in alternate rotational mutually opposing directions so that as each step is alternately driven in the downward direction, the corresponding drive pulley is driven in a first rotational direction for applying rotational driving force through the clutch means to the vehicle, while the other drive pulley is rotated in a second rotational direction, rotationally disengaged from the vehicle by the clutch means;

the clutch means including externally threaded means on the axle, the drive pulleys engaging the externally threaded means so as to move laterally on the axle, toward and alternately away from the hub corresponding to rotation of the drive pulleys in the first, and alternately in the second rotational directions respectively.

2. The step operated vehicle of claim 1 wherein the left and right step motion limiting means each provide a piston actuated within a cylinder including a viscous fluid for resisting the movement of the piston.

3. The step operated vehicle of claim 1 further including a foot engagement means for holding the riders feet on the steps at a desired position and further including a foot stopping means for preventing the riders feet from sliding forward.

4. The vehicle of claim 1 further including a set of clutch spline means on the drive pulleys, and on the hub, the spline means engaging the drive pulleys with the hub when the spline means of either drive pulley and those of the hub are brought into mutual contact, so that with either drive pulley rotating in the first rotational direction, drive force is transferred to the hub, and with either drive pulley rotating in the second rotational direction, disengagement of drive pulley and hub occurs.

5. The vehicle of claim 4 wherein the clutch splines are radially positioned embossments.

* * * * *